(12) United States Patent
Bos et al.

(10) Patent No.: US 10,680,810 B2
(45) Date of Patent: Jun. 9, 2020

(54) METHOD OF GENERATING AN ELLIPTIC CURVE CRYPTOGRAPHIC KEY PAIR

(71) Applicant: NXP B.V., Eindhoven (NL)

(72) Inventors: Joppe Willem Bos, Wijgmaal (BE); Bjorn Fay, Hamburg (DE); Bruce Murray, Hamburg (DE)

(73) Assignee: NXP B.V., Eindhoven (NL)

( * ) Notice: Subject to any disclaimer, the term of this patent is extended or adjusted under 35 U.S.C. 154(b) by 160 days.

(21) Appl. No.: 15/335,177

(22) Filed: Oct. 26, 2016

(65) Prior Publication Data
US 2018/0115419 A1    Apr. 26, 2018

(51) Int. Cl.
*H04L 9/08* (2006.01)
*H04L 9/30* (2006.01)
(Continued)

(52) U.S. Cl.
CPC ........... *H04L 9/0869* (2013.01); *G06F 7/582* (2013.01); *H04L 9/0662* (2013.01);
(Continued)

(58) Field of Classification Search
CPC .... G06F 21/51; G06F 2221/033; G06F 7/582; H04L 9/06887; H04L 63/14;
(Continued)

(56) References Cited

U.S. PATENT DOCUMENTS

| | | | | |
|---|---|---|---|---|
| 4,928,310 | A | * | 5/1990 | Goutzoulis .............. H03K 3/84 331/78 |
| 5,153,532 | A | * | 10/1992 | Albers ..................... H03K 3/84 331/78 |

(Continued)

OTHER PUBLICATIONS

Title: Hardware implementation of elliptic curve digital signature algorithm (ECDSA) on Koblitz curves Authors: Ghanmy Nabil ; Khlif Naziha ; Fourati Lamia ; Kamoun Lotfi Published in: Communication Systems, Networks & Digital Signal Processing (CSNDSP), 2012 8th International Symposium on Date of Conference: Jul. 18-20, 2012.*

(Continued)

*Primary Examiner* — Kambiz Zand
*Assistant Examiner* — Mahabub S Ahmed
(74) *Attorney, Agent, or Firm* — Daniel D. Hill

(57) ABSTRACT

A method is provided for generating an elliptic curve cryptography key pair that uses two topologically identical pseudo-random number generators operating in parallel and in step with each other. One generator operates in the scalar number domain and the other generator operates in the elliptic curve point domain. Parallel sequences of pseudo-random elliptic curve points aG and corresponding scalars a are generated in this manner. A scalar a becomes a private key and an elliptic curve point aG is a public key of a key pair. Each generator is advanced by one iteration successively, and the isomorphic relationship ensures that the point domain generator always contains values which are multiples of the system base point according to values contained in the corresponding position in the number domain generator. In one embodiment, the pseudo-random number generators are each characterized as being lagged Fibonacci generators.

15 Claims, 2 Drawing Sheets

(51) Int. Cl.
*G06F 7/58* (2006.01)
*H04L 9/06* (2006.01)
(52) U.S. Cl.
CPC .......... *H04L 9/0825* (2013.01); *H04L 9/3066* (2013.01); *H04L 9/3073* (2013.01); *H04L 2209/24* (2013.01); *H04L 2209/603* (2013.01)
(58) Field of Classification Search
CPC . H04L 63/1441; H04L 9/0869; H04L 9/0662; H04L 9/0825; H04L 9/3006; H04L 9/3073; H04L 2209/24; H04L 2209/603
USPC .......................................................... 380/46
See application file for complete search history.

(56) References Cited

U.S. PATENT DOCUMENTS

| | | | | |
|---|---|---|---|---|
| 5,363,448 A * | 11/1994 | Koopman, Jr. | ......... | G06F 7/584 340/5.26 |
| 5,566,099 A * | 10/1996 | Shimada | ................ | G06F 7/582 331/78 |
| 6,069,954 A * | 5/2000 | Moreau | ................ | H04L 9/0668 380/268 |
| 6,192,385 B1 * | 2/2001 | Shimada | ................ | G06F 7/582 708/250 |
| 6,201,870 B1 * | 3/2001 | Medard | ................ | H04L 9/0668 331/78 |
| 6,490,352 B1 * | 12/2002 | Schroeppel | .......... | H04L 9/3066 380/279 |
| 6,671,310 B1 * | 12/2003 | Richards | .............. | H04B 1/7176 375/138 |
| 6,778,603 B1 * | 8/2004 | Fullerton | ............. | H04B 1/7172 375/238 |
| 7,822,797 B2 * | 10/2010 | Buer | .................... | H04L 9/0869 708/252 |
| 7,860,912 B1 * | 12/2010 | Gyugyi | ................... | G06F 7/582 708/254 |
| 8,121,290 B2 * | 2/2012 | Teranishi | .............. | H04L 9/3218 380/259 |
| 10,007,488 B2 * | 6/2018 | Kawai | .................... | G06F 7/584 |
| 2002/0006197 A1 * | 1/2002 | Carroll | .................. | H04L 9/0662 380/44 |
| 2002/0044648 A1 * | 4/2002 | Arazi | ...................... | H04L 9/3013 380/30 |
| 2002/0054679 A1 * | 5/2002 | Vesely | .................... | G06F 7/582 380/46 |
| 2003/0095659 A1 * | 5/2003 | Ishihara | .................. | H04L 9/001 380/46 |
| 2004/0078402 A1 * | 4/2004 | Butler | ..................... | G06F 7/588 708/252 |
| 2006/0039558 A1 * | 2/2006 | Morii | ...................... | G06F 7/582 380/46 |
| 2006/0072747 A1 * | 4/2006 | Wood | ....................... | G06F 7/58 380/44 |
| 2006/0153371 A1 * | 7/2006 | Beeson | .................. | H04L 9/3073 380/30 |
| 2006/0174126 A1 * | 8/2006 | Crandall | ............... | H04L 9/3271 713/176 |
| 2006/0233365 A1 * | 10/2006 | Ohno | .................... | H04L 9/0662 380/46 |
| 2006/0280308 A1 * | 12/2006 | Anshel | .................. | H04L 9/0841 380/285 |
| 2007/0189527 A1 * | 8/2007 | Brown | .................... | G06F 7/582 380/44 |
| 2007/0266067 A1 * | 11/2007 | Matsui | .................. | G06F 7/582 708/250 |
| 2008/0085005 A1 * | 4/2008 | Jung | ..................... | H04L 9/0836 380/282 |
| 2008/0144816 A1 * | 6/2008 | Yi | ......................... | H04L 9/3073 380/44 |
| 2009/0041239 A1 * | 2/2009 | Teranishi | .............. | H04L 9/0656 380/46 |
| 2009/0060179 A1 * | 3/2009 | Schneider | ............. | H04L 9/0662 380/46 |
| 2009/0060180 A1 * | 3/2009 | Schneider | ............. | H04L 9/0662 380/46 |
| 2009/0271462 A1 * | 10/2009 | Schneider | ............... | G06F 21/34 708/250 |
| 2009/0323967 A1 * | 12/2009 | Peirce | .................... | H04L 9/0869 380/278 |
| 2010/0153270 A1 * | 6/2010 | Hawkes | .................. | G06F 21/36 705/44 |
| 2010/0211624 A1 * | 8/2010 | Dichtl | ..................... | G06F 7/588 708/251 |
| 2010/0293380 A1 * | 11/2010 | Wiseman | .............. | H04L 9/0855 713/169 |
| 2010/0329455 A1 * | 12/2010 | Nemiroff | .............. | H04L 9/0662 380/46 |
| 2011/0200187 A1 * | 8/2011 | Ghouti | .................. | H04L 9/3066 380/43 |
| 2011/0286595 A1 * | 11/2011 | Resch | ...................... | H04L 9/085 380/46 |
| 2012/0087494 A1 * | 4/2012 | Spalka | .................. | H04L 9/0825 380/46 |
| 2013/0089204 A1 * | 4/2013 | Kumar | ................... | H04L 9/0852 380/256 |
| 2013/0129088 A1 * | 5/2013 | Ivarez Maranon | ..... | G06F 7/582 380/46 |
| 2013/0179691 A1 * | 7/2013 | Naito | ..................... | H04L 9/3252 713/176 |
| 2013/0236009 A1 * | 9/2013 | Ishiguro | ........... | G11B 20/00521 380/46 |
| 2013/0251145 A1 * | 9/2013 | Lowans | ................. | H04L 9/0838 380/44 |
| 2014/0047240 A1 * | 2/2014 | Kato | ..................... | H04L 9/0866 713/171 |
| 2014/0136583 A1 * | 5/2014 | Hyde | ...................... | G06F 7/588 708/250 |
| 2014/0237246 A1 * | 8/2014 | Brown | .................. | H04L 63/062 713/171 |
| 2014/0341374 A1 * | 11/2014 | Thozhuvanoor | ...... | H04L 9/0869 380/28 |
| 2015/0117646 A1 * | 4/2015 | Best | ....................... | H04W 12/08 380/270 |
| 2016/0112069 A1 * | 4/2016 | Lablans | ................ | H03M 13/15 714/752 |
| 2016/0285624 A1 * | 9/2016 | Wagh | ....................... | H04B 3/46 |
| 2016/0380767 A1 * | 12/2016 | Hayashi | .................. | H04L 9/14 380/45 |
| 2017/0091148 A1 * | 3/2017 | Takahashi | ................ | G09C 1/00 |
| 2017/0187530 A1 * | 6/2017 | Ghosh | ................... | H04L 9/3066 |
| 2017/0295011 A1 * | 10/2017 | Borisenko | ................ | G06F 7/76 |
| 2017/0338946 A1 * | 11/2017 | Naslund | ............... | H04L 9/0631 |
| 2017/0359177 A1 * | 12/2017 | Zhu | ...................... | H04L 9/0643 |
| 2018/0026786 A1 * | 1/2018 | Horie | .................... | H04L 9/0618 |
| 2018/0048467 A1 * | 2/2018 | Yoshino | ............... | H04L 9/0662 |
| 2018/0054301 A1 * | 2/2018 | El-Alfy | ............... | H04L 9/0662 |
| 2018/0074791 A1 * | 3/2018 | Atsumi | .................. | G06F 7/582 |
| 2018/0101361 A1 * | 4/2018 | Kawai | ..................... | G06F 7/584 |
| 2019/0215154 A1 * | 7/2019 | Simplicio, Jr. | ........ | G06F 21/602 |

OTHER PUBLICATIONS

Title: The master key: a private authentication approach for pervasive computing environments Authors. Zhu ; M.W. Mutka ; L.M. Ni Published in: Pervasive Computing and Communications, 2006. PerCom 2006. Fourth Annual IEEE International Conference on Date of Conference: Mar. 13-17, 2006.*

Title: An efficient elliptic curve cryptography processor using addition chains with high information entropy Authors: Lawrence Leinweber ; Christos Papachristou ; Francis G. Wolff Published in: Electrical & Computer Engineering (CCECE), 2012 25th IEEE Canadian Conference on Date of Conference: Apr. 29-May 2, 2012.*

Lawrence Leinwebe et al., An efficient elliptic curve cryptography processor using addition chains with high information entropy, 2012 25th IEEE Canadian Conference, Apr. 29-May 2, 2012 (Year: 2012).*

(56) References Cited

OTHER PUBLICATIONS

D. Palmer et al., Decentralized Cooperative Auction for Multiple Agent Task Allocation Using Synchronized Random Number Generators, Proceedings of the 2003 IEEURSJ, 2003 (Year: 2003).*
John K. Salmon et al., Parallel Random Numbers: As Easy as 1, 2, 3, D. E. Shaw Research, New York, NY 10036, USA, 2011 (Year: 2011).*
Bo Allen, Pseudo-Random vs. True Random Bo Allen, From Google Search, https://boallen.com/random-numbers.html, 2012 (Year: 2012).*
Intel Corporation, Intel Digital Random Number Generator (DRNG) (Year: 2012).*
Leinweber et al., An Efficient Elliptic Curve Cryptography Processor Using Addition Chains With High Information Entropy, 25th IEEE Canadian Conference on Electrical and Computer Engineering (CCECE). (Year: 2012).*
Aluru, Lagged Fibonacci Random Number Generators for Distributed Memory Parallel Computers, New Mexico State University (Year: 1997).*
Bi et al., Hardware Acceleration of Parallel Lagged-Fibonacci Pseudorandom Number Generation, University of Tennessee, Knoxville (Year: 2006).*
Li etal, Fast Elliptic Scalar Multiplication Using Lagged Fibonacci Generator, 2014 IEEE 5th International Conference on Software Engineering and Service Science (Year: 2014).*
Ghanmy Nabil et al. Hardware implementation of elliptic curve digital signature algorithm (ECDSA) on Koblitz curves, 2012 8th International Symposium Jul. 18-20, 2012 (Year: 2012).*
Zhu et al., The master key: a private authentication approach for pervasive computing environments, Fourth Annual IEEE International Conference, Mar. 13-17, 2006 (Year: 2006).*
Radu Dogaru, Hybrid Cellular Automata as Pseudo-Random Number Generators with Binary Synchronization Property, 2009 IEEE (Year: 2009).*
Nabil, G. et al., "Hardware Implementation of Elliptic Curve Digital Signature Algorithm (ECDSA) on Koblitz Curves;" 8th International Symposium on Communication Systems, Networks & Digital Signal Processing (CSNDSP), Jul. 13-20, 2012, Poznan, Poland; DOI: 10.1109/CSNDSP.2012.6292648; 6 pages.
Leinweber, L. et al., "An Efficient Elliptic Curve Cryptography Processor Using Addition Chains With High Information Entropy", 25th IEEE Canadian Conference on Electrical & Computer Engineering (CCECE); Apr. 29-May 2, 2012; Montreal, QC, Canada DOI: 10.1109/CCECE.2012.6334841 ; 6 pages.
Zhu, F. et al., "The Master Key: A Private Authentication Approach for Pervasive Computing Environments," Fourth Annual IEEE International Conference on Pervasive Computing and Communications; Mar. 13-17, 2006; Pisa, Italy; DOI: 10.1109/PERCOM. 2006.47; 10 pages.
McEliece, Robert J., "Finite Fields for Computer Scientists and Engineers", California Institute of Technology, 1987, Chapter 9: "Linear Recurrences over Finite Fields".
Federal Information Processing Standards Publication—Digital Signature Standard, 186-4, Chapter 6: "The Elliptic Curve Digital Signature Algorithm (ECDSA)", Jul. 2013.
American National Standards Institute (ANSI), "Public Key Cryptography for the Financial Services Industry: The Elliptic Curve Digital Signature Algorithm (EDSCA)", https://www.security-audit.com/files/x9-62-09-20-98.pdf, Section 5 (ECDSA), Sep. 20, 1998.
Knuth, D. "The Art of Computer Programming", Second Edition, 1981, pp. 27-29, 79-80, 186-188.
Menezes, P. et al., "Handbook of Applied Cryptography", Chapter 2: "Mathematical Background", CRC Press, Inc., 1997.

* cited by examiner

METHOD OF GENERATING AN ELLIPTIC CURVE CRYPTOGRAPHIC KEY PAIR

BACKGROUND

Field

This disclosure relates generally to cryptography and more specifically to a method of generating an elliptic curve cryptographic key pair.

Related Art

Many communication systems and security systems rely on digitally signed messages and in many cases rely on a public key infrastructure (PKI) in which communicating parties are issued with public key and private key pairs according to the normal principles of public key cryptography. Examples of such systems include copy protection, digital rights management (DRM), and other methods of media distribution. Also included are infrastructure systems such as intelligent traffic systems (ITS) where vehicles are required to send and receive thousands of digitally-signed messages per second. Additionally, it is normal for the public keys of each party within such systems to be signed into a digital certificate by a certifying authority (CA). These activities are normally conducted by a key issuing center (KIC), which is responsible for the generation of the necessary random public/private key pairs and associated digital certificates. Generating large numbers of key pairs and signatures in bulk or at high speed is a computationally intensive process, as might be the case when the PKI is intended to provide certified identities for mass-manufactured consumer electronics devices etc.

The normal process of generating elliptic curve public/private key pairs and certifying the public keys thus created involves, per key, the following computational steps (where the standard Elliptic Curve Digital Signature Algorithm EC-DSA is assumed to be employed for certificate creation). In the following steps 1-7, assume the standard provides an elliptic curve E defined over a finite field Fp (denoted as E(Fp)) and a generator point G E E(Fp) of order q.

1. Generate a random number $a \in (Z/qZ)$ as the generated private key.
2. Perform a point multiplication $aG = Q \in E(Fp)$, where the resulting point Q is the corresponding public key.
3. Format the public key Q into a message M, including other data items to be included in the digital certificate e.g. an identifier or serial number, expiration date, etc.
4. Generate a random number $u \in (Z/qZ)$.
5. Perform a point multiplication $uG = P \in E(Fp)$ and compute r, the x-coordinate of point P modulo q.
6. Compute $s = u^{-1}(h(M) + rk) \mod q$, where h(M) is secure hash of the message portion of the digital certificate; and k is the private key of the CA (certification authority i.e. the certificate issuer).

7. Issue (r, s) as the CA's signature on message M.

This process is repeated for every key pair/certificate to be generated. Of these steps, steps 2 and 5, the point multiplications, are the main contributors to the computational load associated with the process. In each of these steps, an elliptic curve point is computed as a random multiple of the system basepoint using a point multiplication algorithm which usually involves hundreds of elementary elliptic curve point operations, for example, point addition and doubling.

Therefore, a need exists for a method to generate elliptic curve key pairs that reduces the number of computations.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
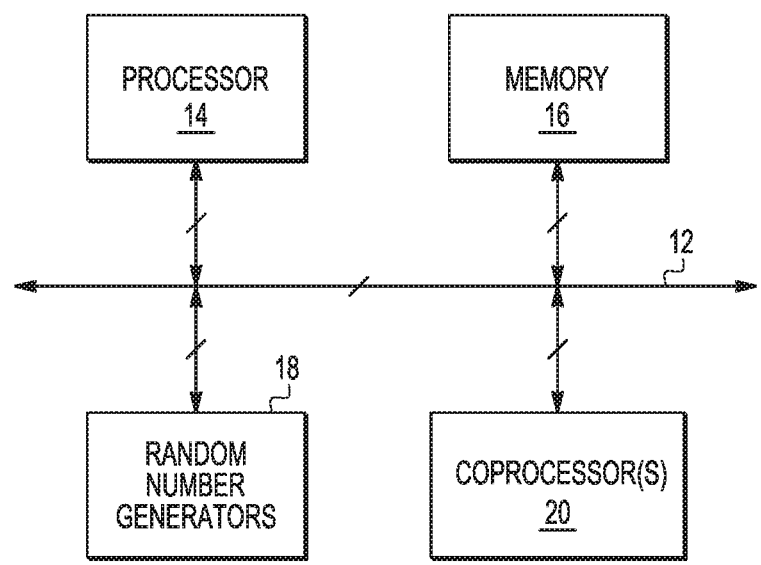
FIG. 1 illustrates, in block diagram form, a data processing system for generating elliptic curve key pairs in accordance with an embodiment.

Generally, there is provided, a method for generating an elliptic curve cryptography key pair that uses two topologically identical pseudo-random number generators operating in parallel and in step with each other. One generator operates in the scalar number domain and the other generator operates in the elliptic curve point domain. Parallel sequences of pseudo-random elliptic curve points aG and corresponding scalars a are generated in this manner. Each generator is advanced by one iteration successively, and the isomorphic relationship ensures that the point domain generator always contains values which are multiples of the system base point according to values contained in the corresponding position in the number domain generator. A scalar a becomes a private key and an elliptic curve point aG becomes a public key. The private key and the public key become a key pair. In one embodiment, the pseudo-random number generators are each characterized as being lagged Fibonacci generators. The described method is for elliptic curve cryptography, but the method is applicable to cryptography using any mathematical group. Examples of mathematical groups includes Diffie_Hellman groups and elliptic curve groups. Mathematical groups are described in the Handbook of Applied Cryptography by Alfred J. Menezes, Paul C. Can Oorschot, and Scott A. Vanstone, CRC Press, October 1996, Chapter 2.5.1.

The computational requirements placed on the signature or certificate creation process are reduced by this method in the case where discrete logarithm methods are used for the PKI. Typically, the method might be expected to produce a reduction in computational load of between one and two orders of magnitude for bulk key pair and certificate production. This would result in a key pair and corresponding certificate throughput improvement for a given server capacity or, alternatively, a significant reduction in server investment for the KIC concerned. The method is applicable to many discrete logarithm based key pair and signature schemes, such as those based on the US Federal Standard Digital Signature Algorithm (DSA), a subgroup discrete logarithm scheme operating in the finite field Fp as described in FIPS-186.

The method for generating key pairs eliminates the need to perform point multiplications for every key pair/certificate generation. Instead, the method exploits a recursive pseudo-random number generator and the properties of a mathematical isomorphism between such a generator and a topologically equivalent one operating in the elliptic curve point domain.

In accordance with an embodiment, there is provided, a method for generating an cryptographic key pair for use in a processor, the method comprising: generating a first pseudo-random number using a first pseudo-random number generator operating in a scalar number domain; generating a pseudo-random group element using a second pseudo-random number generator; and providing a private key from the first random number and a public key from the pseudo-random group element, the private key and the public key being a key pair, wherein the first and second random number generators are operating in step with each other to produce a plurality of key pairs. Generating the first pseudo-random number using the first pseudo-random number generator may further comprise using only one out of p generated pseudo-random numbers, where p is an integer. The method may be embodied in a non-transitory machine-readable storage medium. The first and second random number generators may be characterized as being lagged Fibonacci generators. Generating the first pseudo-random number using the first random pseudo-number generator operating in the scalar number domain may further comprise running the first pseudo-random number generator as a circular buffer. The pseudo-random group element may be characterized as being a pseudo-random elliptic curve point. The first and second random number generators may be characterized as being defined by linear recurrence relations computed over a modulus equivalent to the order of an elliptic curve upon which the plurality of key pairs is generated. Generating the random elliptic curve point using the second random number generator operating in a point domain may further comprise using the second generator to perform a point addition of two points on the elliptic curve. Generating the first random number using the first random number generator operating in a scalar number domain may further comprise performing a modulo operation using the first random number generator.

In another embodiment, there is provided, a method for generating an cryptographic key pair for use in a processor, the method comprising: generating a first pseudo-random number using a first pseudo-random number generator operating in a scalar number domain; generating a pseudo-random member of a mathematical group using a second pseudo-random number generator which performs computations in the mathematical group; and providing a private key from the first pseudo-random number and a public key from the pseudo-random member of the mathematical group, the private key and the public key being a key pair, wherein the first and second pseudo-random number generators operate in step with each other to produce a plurality of key pairs. Generating the first pseudo-random number using a first pseudo-random number generator operating in a scalar number domain may further comprise running the first pseudo-random number generator as a circular buffer. The first and second pseudo-random number generators may be characterized as being lagged Fibonacci generators. Generating the pseudo-random member of the mathematical group using the second random number generator may further comprise using the second random number generator to perform a group operation on two elements of the mathematical group. The first and second random number generators may be characterized as being defined by linear recurrence relations computed over a modulus equivalent to the order of the elliptic curve upon which the plurality of key pairs is generated. Generating the first pseudo-random number using the first pseudo-random number generator operating in the scalar number domain may further comprise performing a modulo operation using the first pseudo-random number generator. Generating the first pseudo-random number using the first pseudo-random number generator may further comprise using only one out of p generated pseudo-random numbers, where p is an integer.

In yet another embodiment, there is provided, a method for generating an elliptic curve cryptographic key pair for use in a processor, the method comprising: generating a first pseudo-random number using a first random number generator operating in a scalar number domain as a circular buffer; generating a pseudo-random elliptic curve point using a second random number generator operating in a point domain as a circular buffer; and providing a private key from the first random number and a public key from the pseudo-random elliptic curve point, the private key and the public key being a key pair, wherein the first and second random number generators are characterized as being lagged Fibonacci generators operating in step with each other. Generating the first pseudo-random number using the first random number generator may further comprise using only one out of p generated random numbers, where p is an integer. Generating the pseudo-random elliptic curve point using the second random number generator operating in the point domain may further comprise using the second random number generator to perform a point addition of two points on the elliptic curve. Generating the first pseudo-random number using the first random number generator operating in the scalar number domain may further comprise performing a modulo operation using the first random number generator.

The method of generating key pairs may be implemented using software running on a data processing system with a key issuing center (KIC). FIG. 1 illustrates, a simplified block diagram of integrated circuit data processing system 10 in accordance with an embodiment suitable for use in generating key pairs in a KIC. Data processing system 10 may be a system-on-a-chip (SoC) implemented on a single integrated circuit, or it may be a combination of chips. In other embodiments, integrated circuit 10 may include another type of circuit such as an ASIC (application specific integrated circuit), FPGA (field programmable gate array), or the like, that can provide execute instructions. In one embodiment, data processing system 10 may include metal-oxide semiconductor (MOS) transistors fabricated using a conventional complementary metal-oxide semiconductor (CMOS) process. In another embodiment, data processing system 10 may include other transistor types, such as bipolar, and may be manufactured with a different process.

Data processing system 10 includes communication bus 12, processor 14, memory 16, random number generators 18, and co-processor 20. Bus 12 may be a conventional bus having a plurality of conductors for communicating address, data, and control information. In other embodiments, bus 12 may be an interconnect structure such as for example, a cross-bar switch or other form of interconnect system. Processor 14 is bi-directionally connected to bus 12. Processor 14 may include one or more of any type of processing element, a processor core, microprocessor, microcontroller, field-programmable gate arrays (FPGAs), application-specific integrated circuits (ASICs), digital signal processor, and the like. There can be any number of processors. Memory 16 is bi-directionally connected to bus 12. Memory 16 can be one or more of any type of volatile or non-volatile memory. Examples of memory types include non-volatile memories such as flash, one-time programmable (OTP), EEPROM (electrically erasable programmable read only memory), and the like. Volatile memory types include static random access memory (SRAM) and dynamic random access memory (DRAM). The memory may be used for storing instructions and/or data. Random number generators 18 includes more than one random number generators, such as a true random number generator and pseudo random number generators as described below regarding FIG. 2. Coprocessor 20 is bi-directionally connected to bus 12 and can be one or more of any type of coprocessor depending on the application. For example, coprocessor 20 may be a coprocessor optimized for running encryption/decryption security software according to the Advanced Encryption Standard (AES) or other type of encryption. AES may be used to encrypt/decrypt data and instructions in data processing system 10. Other types of coprocessors may be provided for processing video, audio, error diagnostics, power management, etc.

Figure 2:
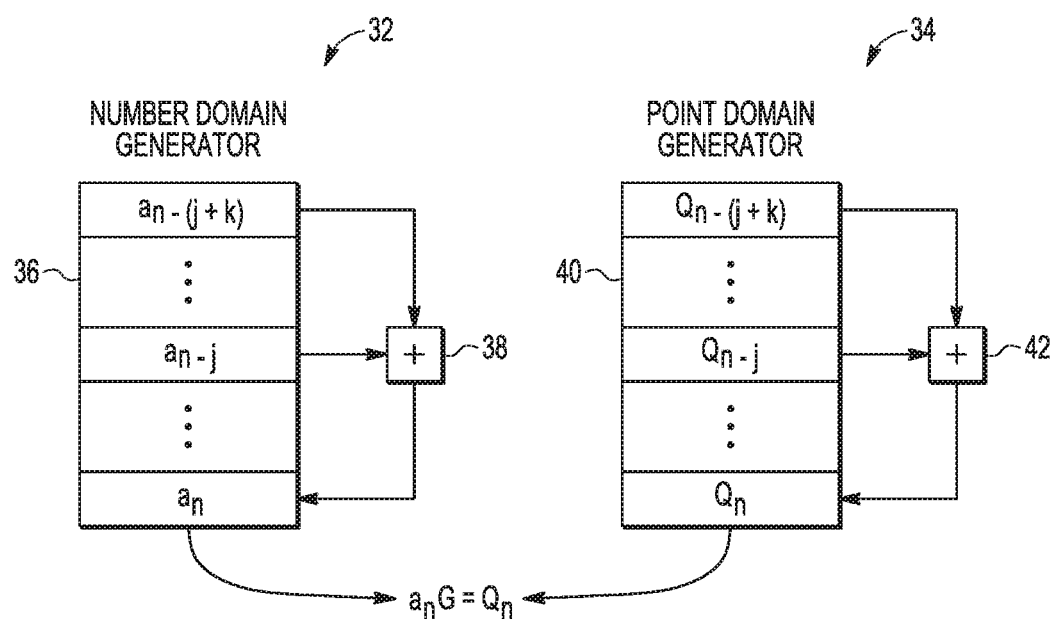
FIG. 2 illustrates, in block diagram form, pseudo-random number generators of the data processing system of FIG. 1.

FIG. 2 illustrates, in block diagram form, pseudo-random number generators 30 of the data processing system of FIG. 1. Pseudo-random number generators 30 includes pseudo-random number generators 32 and 34. Random number generator 32 includes single-point adder 38, and random number generator 34 includes single-point adder 42. Random number generators 32 and 34 are topologically identical pseudo-random number generators operating in parallel and in step with each other. Generally, pseudo-random number generators 30 can be used to generate random members of any mathematical group. Specifically, in accordance with an embodiment, random number generator 32 operates in the scalar number domain and random number generator 34 operates in the elliptic curve point domain. Parallel sequences of pseudo-random elliptic curve points aG and corresponding scalars a are generated in this manner. Each generator is advanced by one iteration successively, and the isomorphic relationship ensures that the point domain generator always contains values which are multiples of the system base point according to values contained in the corresponding position in the number domain generator. In one embodiment, the pseudo-random number generators are each characterized as being lagged Fibonacci generators. The parallel lagged Fibonacci generators only requires a single point addition within the elliptic curve point domain generator, rather than a full point multiplication, thus significantly reducing the number of computations required for bulk key pair and certificate generation.

A trinomial $x^{j+h}+x^h+1$ which is primitive over $F_2$ is chosen (e.g. from published tables) with a sufficiently large degree. The value j+h will be denoted as the value m in the following discussion.

The number domain array 36 is a (j+h+1)-element array a[ ] (i.e. indexed 0 to j+h) of scalar bignumbers (sufficient to hold values mod $2^m$ where m is the bitlength of q) and is initialized with m-bit random values preferably derived from a true random number generator of block 18 of FIG. 1. In the unlikely event that all of the initialized values are even, at least one of them is substituted with an odd value.

Point domain array 40 is a (j+h+1)-element array of elliptic curve points Q[ ] and is initialized with corresponding values equal to the a[ ] array values multiplied by the basepoint G; so Q[i]=a[i]G for 0≤i≤(j+h).

In one embodiment, number domain random generator 32 is run by using the number domain array 36 as a circular buffer in which the iteration $a_n = a_{n-j} + a_{n-(j+h)} \bmod 2^m$ is executed using stored a[ ] values. The number range 0 . . . $2^m-1$ is treated as a redundant representation (sometimes known as "Omura representation") of the mod q values 0 . . . q−1, such that the numbers q . . . $2^m-1$ are considered to be duplicate representations of the values 0 . . . $2^m-1-q$.

Each iteration step of number domain generator 32 is mirrored by a corresponding iteration step in point domain generator 34, which is designed to use an iterator with the same topology i.e. $Q_n = Q_{n-j} + Q_{n-(j+h)}$, but here the operation performed is an addition of two points on the defined elliptic curve. Because the addition operation within point domain generator 34 is isomorphic to a mod q addition within the number domain generator 32, a corrective step is required when an overflow is detected in number domain generator 32 (i.e. whenever a mod $2^m$ reduction is performed). This takes the form of adding a precomputed corrective point of value $(-2^m)G$, equivalent to $(2q-2^m)G$; since $2^{m-1} \leq q < 2^m$. The value $(2q-2^m)$ is always positive and less than q.

Assuming that number domain generator 32 was initialized with uniformly distributed random values in the full number range 0 . . . $2^m-1$, its output would remain uniformly distributed in this range. To ensure that the generated scalars (and the corresponding points) are in fact uniformly distributed mod q, outputs are only derived from random number generator 30 when number domain generator 32 produces an output in the range 0 . . . q−1. In other words, we do not use the random number generator 30 outputs whenever number domain generator 32 value is q. Doing this would reduce the system efficiency to approximately $q/2^m$. That is, on average $2^m/q$ iterations per scalar/point produced would be needed. Furthermore, on average, half of these iterations would need 2 point additions instead of 1 point addition due to the corrective step requirement. Thus, overall, $3(2^{m-1}/q)$ point additions per scalar/point produced is needed in executing this process.

In another embodiment, either the same primitive polynomial and thus iterator topology can be used, or a different one can be adopted. Also, different number size parameters or elliptic curve definitions may be needed if the key pair is defined on a different elliptic curve from that of the entity key pairs being created. In addition, random outputs for the signing operation could come from the same generator system as was used for the key pair generation.

By replacing each point multiplication by $3 \cdot (2^{m-1}/q)$ point additions, we would achieve a large increase in throughput; at a typical size for q of 256 bits, a point multiplication might typically be computationally equivalent to about 350 to 400 point additions, depending on implementation details. On the other hand, the quantity $3(2^{m-1}/q)$ is in the range 1.5 to 3, so the approximate improvement that would be achieved is a factor of 100 or more, depending on the value of q. However, in practice, security considerations reduce this improvement factor, though not to the degree that the usefulness of the invention is undermined.

The above described method for generating key pairs is applicable to all forms of elliptic curve cryptography regardless of the underlying field, and can be adapted to other discrete logarithm signature schemes by replacing the elliptic curve point operation with whatever operation is appropriate, e.g. for DSA, using the property that $$g^a \cdot g^b \bmod p = g^{(a+b) \bmod q} \bmod p$$

and, analogously to the point domain generator, defining a "power domain" generator using multiplication mod p as an operator. Also, the method described in this disclosure works in any mathematical group having a plurality of group elements. Examples include the so-called Diffie-Hellman groups and the elliptic curve groups described herein. Mathematical groups are described in the Handbook of Applied Cryptography by Alfed C. Menezes, Paul C. Can Oorschot, and Scott A. Vanstone, CRC Press, October 1996, Chapter 2.5.1.

It is important to consider the security implications for a KIC that uses the above described method for generating key pairs. In doing so, it is observed that every generator value (in both domains) has two "antecedents", e.g. the elliptic curve point $Q_n$ has as antecedents the values $Q_{n-j}$ and $Q_{n-(j+k)}$ such that $Q_n = Q_{n-j} + Q_{n-(j+k)}$, and correspondingly, the discrete logarithms of these points with respect to a basepoint have a similar additive relationship, i.e.

$$a_n = a_{n-j} + a_{n-(j+k)} \bmod q$$

The presence of these additive relationships, if not managed carefully, has the potential to compromise the security of a key or certificate issuing facility. For example, if a facility, such as a KIC that issues EC-DSA certificates in batches using the above described method for generating key pairs, allows these additive relationships between specific published certificates to be easily inferred, the private signing key can be exposed. To see this, recall that the EC-DSA signature parameters r and s are computed using the signing equation $$s = u^{-1}(h(M) + rk) \bmod q$$

although for the purposes of this section it helps to write this equation in the form $$u = s^{-1}h(M) + s^{-1}rk \bmod q$$

or $$u = A + Bk \bmod q$$

where A and B are values which can be computed from the published certificate, and k is the private key of the signing facility (which is the same for all issued certificates). Recall also that u is a random nonce used in signing, and in the described method for producing key pairs would be derived from number domain generator 32. A traditional attack on the signer's key using a single certificate would require solution of an elliptic curve discrete logarithm problem to compute u, r being the x-coordinate of the point uG. However, if an attacker can find 3 certificates with the requisite additive relationships in their u-values, the attacker can write three equations $$u_1 = A_1 + B_1 k \bmod q$$

$$u_2 = A_2 + B_2 k \bmod q$$

$$u_3 = A_3 + B_3 k \bmod q$$

and the knowledge that $u_3 = u_2 + u_1$ provides the attacker with a set of 3 simultaneous linear equations in $u_1$, $u_2$ and k, which can thus be used to derive the signer's private key, and thereby compromise the entire system. In order to quantify how difficult this is for an attacker, it needs to be determined how difficult it is to find three certificates with the requisite additive relationship within a batch of such certificates. If the signing order of issued certificates is visible to the attacker (i.e. the attacker knows in which order the signing equation values for all certificates were derived from the generator system), the attacker would simply require three certificates from the batch with relative index numbers n, n−j, and n−(j+k) (ignoring the effects of probabilistic discard of outputs). However, presuming the party controlling the signing facility has the opportunity to randomly permute the generator system outputs, then the attacker must search for the requisite relationships within the batch of key pairs, and the difficulty of doing so is a function of the batch size. Assuming a batch size B is large compared to the generator length, the worst case number of choices required to find 3 such certificates is approximately $(B-1)(B-2)/4$. After the first certificate is chosen arbitrarily, there are four other certificates out of the remaining (B−1) with which it can participate in an additive relationship, whereupon the third certificate needed is uniquely defined within the remaining B−2.

Identifying whether randomly chosen certificates have the requisite additive relationships is not difficult because the r component of any certificate is simply the x-coordinate (reduced modulo q) of uG. The attacker simply needs to check by point addition whether these x-coordinates can belong to a triplet of points with an additive relationship between them. This can be achieved with a small number of point addition operations, the exact number only having a very minor effect on the overall workfactor. Taking this into account, it can be seen that the workfactor for such an attack is roughly $O(B^2)$, which for moderate batch sizes would not provide adequate security e.g. for a batch size $B=10^3$, a workfactor of only $10^6$ is achieved. In practice, it is desirable that a workfactor of any attack to be comparable with that of attacking the underlying cryptographic scheme. For example, if the system was being used to create certificates using 160 bit elliptic curve digital signature algorithm (EC-DSA), it would be necessary to achieve a workfactor of at least $2^{80}$ (i.e. $10^{24}$ which is the workfactor of the underlying elliptic curve discrete logarithm problem.

The workfactor can be increased by "puncturing" the generator system outputs. The concept of puncturing comes from coding theory. In simple terms, this means that, rather than using every (number, point) pair produced by the generator system, only 1-out-of-p (where p is an integer which will be referred to as the puncturing ratio) will actually be used to generate published certificates, the rest being discarded. While this reduces the efficiency of the generator system in providing (number, point) pairs, it provides an increase in the workfactor of any attack based on the remaining additive relationships and thus enables the invention to be used at an adequate level of security. The workfactor of the attack is higher than without puncturing, since the attacker now has to identify more certificates from a batch of key pairs.

In the described embodiment, two chains modulo q and modulo $2^m$ are computed, and two (j+h+1)-element arrays are required to store the intermediate results of the computations. In order to remove the overhead and avoid adjusting the two sequences to work together, a further embodiment can use a single modulus by applying the theory of linear recurrences over finite fields. The second order linear recurrence relation over $F_q$ can be defined as $$s_t = a_1 \cdot s_{t-1} + a_2 \cdot s_{t-2} \bmod q, \quad (1)$$

where $a_1, a_2 \in F_q$ and q is a prime number. The characteristic polynomial of the recurrence of equation (1) is $$f(x) = x^2 - a_1 x - a_2$$

assuming that characteristic polynomial f(x) is irreducible. This implies that f(x) has two distinct conjugate roots $\alpha$ and $\alpha^q$ in a finite field $F_{q^2}$. Then, the period n of sequence 1 is equal to the order of $\alpha$ (in $Fq_2$). For non-zero solutions to equation (1), different sequences can be produced. The number of cyclic equivalence classes of nonzero solutions is $$N = (q^2 - 1)/n.$$

Therefore, if N=1 then all the nonzero solutions are cyclically equivalent. Given the prime order q, select a polynomial $f(x) = x^2 - a_1 x - a_2$ which is irreducible over $F_q$. Then, the "number domain array" a[ ] of size two is initialized with two random values from $F_q$ (not both zero). Next, the "point domain array" contains the two elliptic curve points $Q[0]=[a[0]]G$, and $Q[1]=[a[1]]G$.

Computing the next scalar value k and result of the scalar multiplication R can be obtained with $k=a_1 \cdot a[1]+a_2 \cdot a[0] \bmod q$ $R=[k]G=a_1 \cdot G[1]+a_2 \cdot G[0]$ and updating the stored values as $a[0] \leftarrow a[1], a[1] \leftarrow k,$ $G[0] \leftarrow G[1], G[1] \leftarrow R.$ Further embodiments can use alternate recurrence relations of second or higher order, in which the coefficients of the characteristic equation are small integers which result in correspondingly small scalar multiplication factors within the point domain generator; in these embodiments the modulus over which the recurrence relation is computed will correspond to the order q of the elliptic curve upon which key pairs are generated.

The described method for computing key pairs with the random number generators of FIG. 2 is applicable to all copy protection, digital rights management (DRM) and broader security schemes in which a large PKI must be established through a KIC or signing facility. More generally, any bulk signing, key or certificate generation scheme operating in a "batch" mode with a discrete logarithm based signing signature scheme can benefit from the described embodiment.

Figure 3:
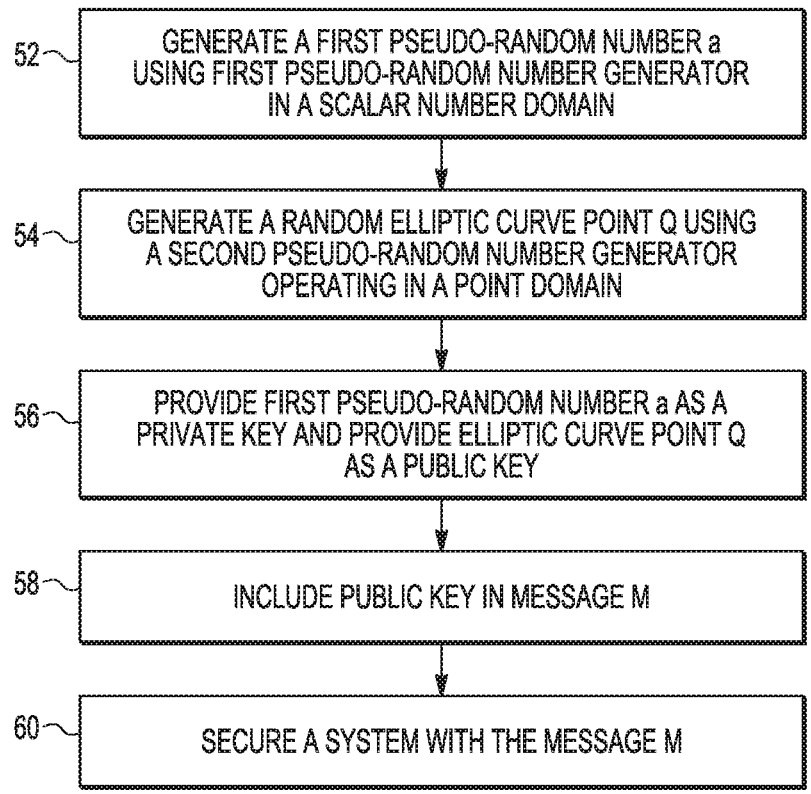
FIG. 3 illustrates a flow chart of a method for generating elliptic curve key pairs in accordance with an embodiment.

FIG. 3 illustrates a flow chart of a method 50 for generating elliptic curve key pairs in accordance with an embodiment. Method 50 is performed on a computer system such as data processing system 10 of FIG. 1 using random number generators such as random number generators 30 of FIG. 2. At step 52, a first pseudo-random number labeled "a" is generated using a first random number generator, such as pseudo-random number generator 32. The first pseudo-random number generator 32 is operating in the scalar number domain as described above. At step 54, a second pseudo-random number generator, such as pseudo-random number generator 34, generates a pseudo-random elliptic curve point labeled "Q". The second pseudo-random number generator is operating in the point domain. At step 56, the first pseudo-random number a is provided as a private key and the pseudo-random elliptic curve point Q is provided as a public key. The private key and the public key, generated in this way, is a key pair as shown in step 56. Steps 52, 54, and 56 of method 50 are repeated until a batch of key pairs is generated. At step 58, the public key Q may be including in a message M with other data items to be included in the digital certificate, for example, an identifier or serial number, expiration date, etc. At step 60, a system, device, or other material is secured using message M.

As used herein, the term "non-transitory machine-readable storage medium" will be understood to exclude a transitory propagation signal but to include all forms of volatile and non-volatile memory. When software is implemented on a processor, the combination of software and processor becomes a single specific machine. Although the various embodiments have been described in detail, it should be understood that the invention is capable of other embodiments and its details are capable of modifications in various obvious respects.

Because the data processing implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for generating a plurality of cryptographic key pairs for bulk key pair production, the method comprising:
    generating a first pseudo-random number using a first pseudo-random number generator operating in a scalar number domain to generate a private key;
    generating a pseudo-random elliptic curve point using a second pseudo-random number generator operating in a point domain to perform a single point addition of two points on the elliptic curve to generate a public key;
    advancing the second pseudo-random number generator successively with the first pseudo-random number generator, the second pseudo-random number generator providing values that are multiples of a system base point according to values provided by the first pseudo-random number generator; and
    providing the private key from the first pseudo-random number generator and the public key from the second pseudo-random generator, the private key and the public key being one key pair of the plurality of cryptographic key pairs,
    wherein the first and second pseudo-random number generators are operating in parallel and in step with each other to produce the plurality of cryptographic key pairs, and wherein using the single point addition instead of a point multiplication to generate the public key results in a reduction of computational load.

2. The method of claim 1, wherein generating the first pseudo-random number using the first pseudo-random number generator further comprises using only one out of p generated pseudo-random numbers, where p is an integer.

3. The method of claim 1, wherein the first and second pseudo-random number generators are characterized as being lagged Fibonacci generators.

4. The method of claim 3, wherein generating the first pseudo-random number using the first random pseudo-number generator operating in the scalar number domain, further comprises running the first pseudo-random number generator as a circular buffer.

5. The method of claim 1, wherein the first and second pseudo-random number generators are characterized as being defined by linear recurrence relations computed over a modulus equivalent to the order of an elliptic curve upon which the plurality of cryptographic key pairs is generated.

6. The method of claim 1, wherein generating the first random number using the first pseudo-random number generator operating in a scalar number domain further comprises performing a modulo operation using the first pseudo-random number generator.

7. A non-transitory machine-readable storage medium comprising
computer-readable instructions executable by a microprocessor to:
generate a first pseudo-random number using a first pseudo-random number generator operating in a scalar number domain to generate a private key;
generate a pseudo-random elliptic curve point using a second pseudo-random number generator operating in a point domain perform a single point addition of two points on the elliptic curve to generate a public key;
advance the second pseudo-random number generator successively with the first pseudo-random number generator, the second pseudo-random number generator providing values that are multiples of a system base point according to values provided by the first pseudo-random number generator; and
provide the private key from the first pseudo-random number generator and the public key from the second pseudo-random number generator, the private key and the public key being a key pair,
wherein the first and second pseudo-random number generators operate in parallel and in step with each other to produce a plurality of key pairs for bulk key pair production, and wherein using the point addition instead of a point multiplication to generate the public key results in a reduction of computation load.

8. The non-transitory machine-readable storage medium of claim 7, wherein the computer-readable instructions to generate the first pseudo-random number using a first pseudo-random number generator operating in a scalar number domain further comprises computer-readable instructions to run the first pseudo-random number generator as a circular buffer.

9. The non-transitory machine-readable storage medium of method of claim 7, wherein the first and second pseudo-random number generators are characterized as being lagged Fibonacci generators.

10. The non-transitory machine-readable storage medium of method of claim 7, wherein the first and pseudo-second random number generators are characterized as being defined by linear recurrence relations computed over a modulus equivalent to the order of the elliptic curve upon which the plurality of key pairs is generated.

11. The non-transitory machine-readable storage medium of method of claim 7, wherein the computer-readable instructions to generate the first pseudo-random number using the first pseudo-random number generator operating in the scalar number domain further comprises computer-readable instructions to perform a modulo operation using the first pseudo-random number generator.

12. The non-transitory machine-readable storage medium of claim 7, wherein the computer-readable instructions to generate the first pseudo-random number using the first pseudo-random number generator further comprises computer-readable instructions to use only one out of p generated pseudo-random numbers, where p is an integer.

13. A system for generating an elliptic curve cryptographic key pair for use in a processor, the system comprising a microprocessor executing instructions to:
generate a first pseudo-random number using a first pseudo-random number generator operating in a scalar number domain as a circular buffer to generate a private key;
generate a pseudo-random elliptic curve point using a second pseudo-random number generator operating in a point domain as a circular buffer to perform a single point addition of two points on the elliptic curve to generate a public key;
advance the second pseudo-random number generator successively with the first pseudo-random number generator, the second pseudo-random number generator providing values that are multiples of a system base point according to values provided by the first pseudo-random number generator; and
provide the private key from the first pseudo-random number and the public key from the second pseudo-random number generator, the private key and the public key being a key pair of a plurality of key pairs,
wherein the first and second random number generators operate in parallel and in step with each other to produce the plurality of key pairs for bulk key pair production, and wherein using the point addition instead of a point multiplication to generate the public key results in a reduction of computational load.

14. The system of claim 13, wherein the microprocessor executing instructions to generate the first pseudo-random number using the first pseudo-random number generator further comprises the microprocessor executing instructions to use only one out of p generated random numbers, where p is an integer.

15. The system of claim 13, wherein the microprocessor executing instructions to generate the first pseudo-random number using the first pseudo-random number generator operating in the scalar number domain further comprises the microprocessor executing instructions to perform a modulo operation using the first pseudo-random number generator.

* * * * *